J. MacLAURIN.

SEALING MACHINE.

APPLICATION FILED JAN. 29, 1917.

Reissued Mar. 20, 1917.

14,276.

Inventor:

John MacLaurin.

By Henry J. Miller.

atty.

THE NORRIS PETERS CO., PHOTO-LITHO., WASHINGTON, D. C.

UNITED STATES PATENT OFFICE.

JOHN MacLAURIN, OF BROOKFIELD, MASSACHUSETTS.

SEALING-MACHINE.

14,276. Specification of Reissued Letters Patent. Reissued Mar. 20, 1917.

Original No. 1,196,796, dated September 5, 1916, Serial No. 35,947, filed June 23, 1915. Application for reissue filed January 29, 1917. Serial No. 145,303.

*To all whom it may concern:*

Be it known that I, JOHN MACLAURIN, a subject of the King of England, residing at Brookfield, in the county of Worcester and State of Massachusetts, have invented a new and Improved Sealing-Machine, of which the following is a specification, reference being had to the accompanying drawings, forming part thereof.

This invention has reference to an improved machine adapted for use in the application of a sealing member tape, ribbon or strip having adhesive which preferably is adapted to be rendered soft or tacky by heat.

One object of this invention is to so construct a sealing machine of a size and structure adapted conveniently to be operated as a hand implement in the application by heat of a sealing strip or tape, taken by this machine from a source of supply exterior of the machine which source of supply may be larger than the machine would accommodate under ordinary conditions.

Another object of the invention is to provide a machine for laying, pressing and heating a sealing member having material to be rendered adhesive by such heat.

Another object of the invention is to provide a machine of this nature having means to sever the sealing member or tape and, supplementary to such severing operation, to prevent the retractive movement of the sealing member or tape or, in effect, such relative movement between the tape and the machine as might cause the unthreading or withdrawal of the sealing tape or member from the machine.

Another object of the invention is to provide a sealing machine of this nature in which after the applied portion of the sealing member or tape has been severed from the main portion of said member or tape the machine can be operated to press and heat said severed end of the applied portion without feeding forward said main portion.

Other objects of the invention will appear from the following description.

The invention consists in the machine having a frame adapted conveniently to be guided and operated by the hand of an operator to accomplish the laying, pressing and heating of the sealing member or tape and, at times, the severing of said member or tape and the release of the main portion thereof from feeding action.

The invention also consists in such other novel features of construction and combination of parts as shall hereinafter be more fully described and pointed out in the claims.

Figure 1:
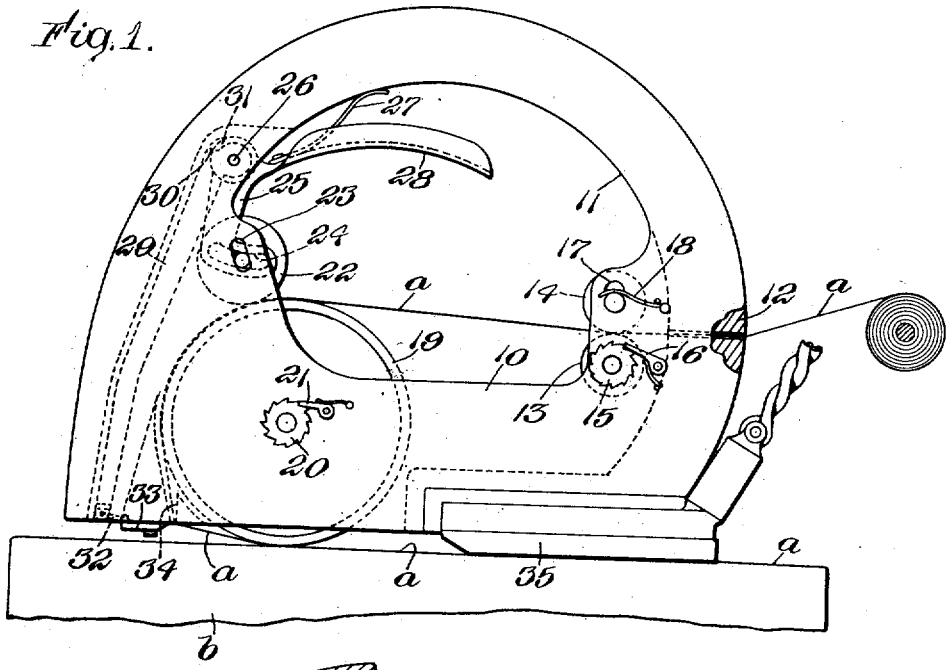
Figure 1, represents a side elevation of the machine constructed in accordance with this invention.

Referring to the drawings there is shown a frame 10 having a handle 11 thereon which is so shaped that it may be grasped by the hand of an operator to advance and guide the machine and from time to time to operate some of the parts to be hereafter described.

The frame 10 is provided at 12 with a slot to receive a sealing tape or member from any source of supply exterior of the machine such as a suspended reel and to guide said tape passing through said slot to and between the rollers 13 and 14 of which the roller 13 has the ratchet 15 formed thereon to receive a pawl 16 and thereby restrict the rotation of the roller 13 to one direction while the shaft of the roller 14 is rotatably mounted in an elongated bearing 17 to permit vertical movement of said roller 14 with respect to the frame to receive the adhesive tape between the rollers 13 and 14 and provision is made by means of a spring as 18 to press the shaft of roller 14 toward roller 13.

Between the side bars of frame 10 is rotatably mounted the large roller 19 having on its shaft the ratchet 20 which coöperates with the spring pressed pawl 21 in restricting the rotation of said roller 19 to one direction. Pressure roller 22 has its shaft movably journaled in the elongated bearings 23 of the frame 10 and also in the cam slots 24 in the arms 25 of a lever which is fulcrumed at 26 and has the handle 28 against which the spring 27 acts to press downward said handle 28 and effect the bearing of pressure roller 22 against the periphery of roller 19 or of a strip carried on said periphery. On said pin 26 is pivoted the arm 29 which has a shoulder 30 formed thereon with which a lug 31 engages when the handle 28 has been swung through a portion of its movement. As the arm 29 is swung a link 32 connecting said arm and the cutter 33 causes said arm to actuate said cutter and move the same across an opening 34 in the lower forward portion of the main frame 10. At the lower rear portion of said frame 10 is mounted the heater element 35 which may be of any ordinary or well known construction to deliver heat to material over which said element 35 passes.

While I may prefer to use a heating element having a smoothing and ironing effect it is apparent that any form of heater may be applied to frame 10 without changing the spirit of this invention. It is possible to substitute a rotary heater such as to convert the roller 19 into a heater but for convenience it will be understood that the heater 35 is one of a common type utilizing electricity for the generation of heat.

The sealing tape, member or strip used with this machine usually consists of a strip of paper, cloth or other fabric supplied with material which under normal atmospheric temperatures or conditions is non-sticky or non-tacky but which may be rendered tacky or adhesive by a temperature somewhat higher than the normal atmospheric temperature. This sealing tape or member *a—a* is usually wound as a roll and is located or suspended in a position convenient to the point at which the improved machine is to be operated to apply a portion of said tape or member *a—a* to the wrapper of the package *b* or to any other wrapper or article to which sealing, strengthening or other strips are adhesively applied.

Preliminary to the operation of the machine the sealing tape or member *a—a* is passed through slot 12, between the rollers 13 and 14, then between rollers 19 and 22 and through the opening 34 and thence, preferably, to a point at which the end portion of said tape or member *a—a* may be operated on by the heater 35. The free end of the sealing tape or member may now be placed with its adhesive or adhesive surface against the article *b* and the heater 35 is then pressed or placed against said sealing tape or member *a—a* whereby to supply heat to render said adhesive tacky. As soon as adhesion is effected between the strip *a—a* or its adhesive material and the package or article *b* the machine is advanced and guided by the hand of the operator in the direction in which it is desired to apply and affix the sealing strip or member and a suitable downward pressure is maintained on the machine during such advancement. By the operation of the machine as thus described any desired length of the sealing tape or member may have its adhesive rendered tacky by heat from the heater 35 and be pressed into adhesion with the article *b* and when such adhesive sets it forms a practically perfect seal which is not affected by moisture.

As the sealing tape or member *a—a* is under some slight tension in its passage between the sets of rollers 13 and 14 and 19 and 22 the initial forward movement of the machine tends to draw taut the sealing tape or member *a—a* against the lower portion of the roll 19 which guides, lays and presses the strip *a—a* against the article *b* in position to receive the heater 35 as the machine is advanced. If it is necessary or desirable pressure toward the forward part of the machine may increase the pressure of roll 19 on the strip *a—a*. While this roll 19 may be considered a feeding roll as well as a guiding and pressing roll I do not intend by the use of the term "feeding" to limit my invention it being understood that the operation of roll 19 to guide or feed the sealing tape or member *a—a* through the opening 34 is effected principally by advancement of the machine over the affixed portion of tape or member *a—a* and the rotation of roll 19 by frictional contact with said tape or member or other surface, if any, over which roll 19 travels in such advancement.

Figure 2:
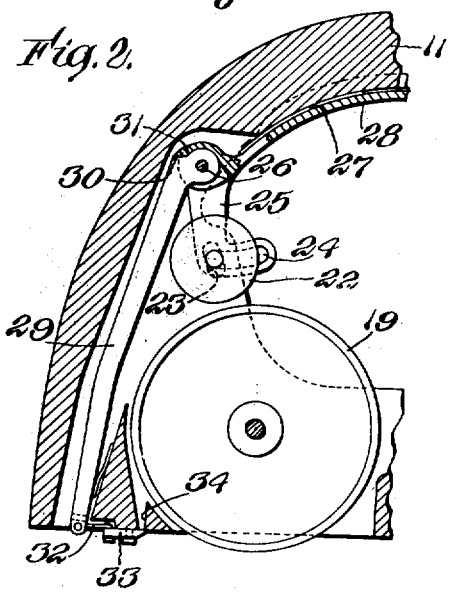
Fig. 2, represents a vertical sectional view in a plane parallel to that shown in Fig. 1, and Fig. 3, represents a vertical cross sectional view through the machine.
Figure 3:
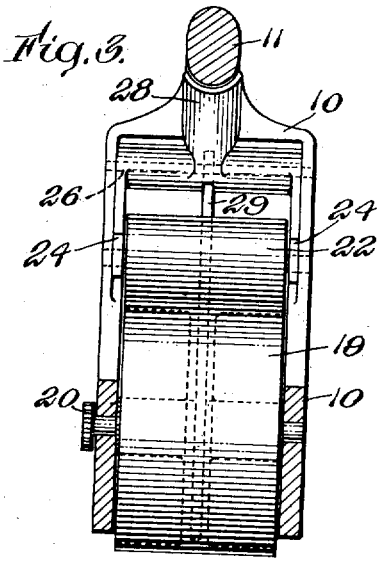

When, in such progressive application of the sealing tape or member *a—a*, the forward end of the machine is near the point at which it is desired to sever the affixed portion of said tape or member from the main supply handle 28 is operated against the action of the spring 27 with the result that arm 29 is moved to actuate cutter 33 to sever the tape or member *a—a* at the mouth of opening 34 and pressure roll 22 is moved out of contact with the said tape or member *a—a* the forward end of which remains in the opening 34 as the rolls 13 and 14 prevent the retraction of such tape or member. After such severing operation the advance of the machine may continue until the heater 35 has reached the end of the tape or member *a—a* and supplied heat and pressure thereto to render the adhesive thereof tacky and to press said tacky adhesive into contact with article *b*. In such final forward movement handle 28 is held in the raised position so that roller 22 is elevated as shown in Fig. 2 of the drawing and does not press the sealing tape or member *a—a* against roll 19 and hence the latter does not act to feed such tape or member but merely rotates, pressing on the severed end portion of the affixed tape or member and acting to sustain the forward end of the machine frame.

Various modifications may be made within the scope of this invention without departing from the spirit thereof and the drawings are submitted for illustrative purposes only.

Having thus described my invention I claim as new and desire to secure by Letters Patent—

1. A hand operated machine for applying sealing tape in indeterminate lengths comprising a hand grip having a heat applying device adapted to be moved progressively over a strip, and means to guide a sealing strip from an exterior main supply to a point to receive said heat applying device.

2. A hand operated machine for applying sealing tape in indeterminate lengths comprising a hand grip having a fixed heat applying presser element, and means to guide a sealing strip from a main supply exterior of said grip, through said grip to a point to receive the pressure of said heat applying element in the progressive movement of said machine.

3. A hand operated machine for applying sealing tape in indeterminate lengths comprising a hand grip having a base constituted in part by a heat applying element, and having a strip guiding means mounted between said element and the forward end of said base.

4. A hand operated machine for applying sealing tape by progression of said machine over the tape, comprising a frame having a hand grip, a heater element carried by said frame, means to guide the tape to position to receive said heating element in the progression of the machine, and a manually operated tape severing device.

5. A hand operated machine for applying sealing tape in indeterminate lengths comprising means for progressively withdrawing the tape from a main source of supply as the machine is moved and guiding it into operative position, and a heat applying element which sets the tape thus positioned.

6. A hand operated machine for applying sealing tape comprising a frame having a hand grip, a roller for progressively withdrawing the tape from a main source of supply and guiding it into operative position, a heater element which sets the tape thus positioned and a manually operated severing device.

7. A hand operated machine for applying sealing tape in indeterminate lengths comprising a hand grip having a presser and feeding roller, a severing device, and means normally acting to maintain a tape in feeding relation with said feeding roller and operable with said severing device to release said tape.

8. A hand operated machine for applying sealing tape in indeterminate lengths comprising a hand grip having a heat applying means, a tape feeding device, a tape severing device, a tape checking means and means to simultaneously operate said severing device in the active direction and a member of said feeding device to an inoperative position.

9. A hand operated machine for applying adhesive sealing tape in indeterminate lengths comprising means operated by the progression of the machine for drawing sealing tape from a source of supply exterior of the machine and for delivering said tape in position with its adhesive against the article to which it is to be affixed, and a heater following the tape as positioned to supply heat to said adhesive.

10. In a sealing machine, a frame, an applying roller journaled therein, a pressure roller co-acting with said applying roller for advancing a sealing tape, a cutter for severing the tape, a heater for softening the adhesive surface of the sealing tape, and a lever for moving the pressure roller to spaced relation with respect to said applying roller and simultaneously actuating said cutter.

11. In a sealing machine, a frame, an applying roller journaled therein, said applying roller being restricted to rotation in one direction, a pressure roller co-acting with said applying roller for advancing a sealing tape, a cutter for severing the tape, a heater for softening the adhesive surface of the sealing tape, and checking rollers for preventing withdrawal of the sealing tape from the frame.

12. In a sealing machine, a frame, an applying roller journaled in said frame having restricted rotation to one direction, a pressure roller co-acting with said applying roller for advancing a sealing tape, means for releasing said pressure roller from engagement with said applying roller, and checking rollers for engagement with the sealing tape, for preventing withdrawal of the sealing tape from said frame.

13. In a sealing machine, a frame, an applying roller journaled therein for rotation in one direction, a pressure roller co-acting therewith for advancing a sealing tape, a cutter for severing the tape after passing between the applying and pressure rollers, a manually operated lever having cam slots formed therein for moving said pressure roller from co-acting relation with said applying roller, and an arm actuated by said lever for actuating said cutter.

14. In a sealing machine, a frame, an applying roller journaled therein for rotation in one direction, checking rollers journaled in said frame to receive a web of sealing tape therebetween, a pressure roller carried by said frame co-acting with said applying roller, said pressure roller being journaled in slots radially disposed with respect to said applying roller, a lever fulcrumed to said frame, said lever supporting arms which straddle said pressure roller, said arms of said lever being slotted eccentrically with respect to the fulcrum for said lever, said slotted arms also supporting said pressure roller, a cutter carried by said frame, an arm connected to said cutter, said arm being actuated by said lever upon compression of a limited movement of said lever and a heating element carried by said frame to overlie a sealing tape supplied by said applying roller to soften the adhesive surface of said sealing tape.

JOHN MacLAURIN.

Copies of this patent may be obtained for five cents each, by addressing the "Commissioner of Patents, Washington, D. C."